(12) United States Patent
Nadon

(10) Patent No.: US 10,859,314 B2
(45) Date of Patent: Dec. 8, 2020

(54) GAS LIQUEFACTION COLUMN

(71) Applicant: Gilles Nadon, Beauharnois (CA)

(72) Inventor: Gilles Nadon, Beauharnois (CA)

( * ) Notice: Subject to any disclaimer, the term of this patent is extended or adjusted under 35 U.S.C. 154(b) by 371 days.

(21) Appl. No.: 16/018,059

(22) Filed: Jun. 26, 2018

(65) Prior Publication Data

US 2019/0390900 A1 Dec. 26, 2019

(51) Int. Cl.
*F25J 3/04* (2006.01)
*F25J 1/00* (2006.01)
*F25J 3/02* (2006.01)

(52) U.S. Cl.
CPC ......... *F25J 3/04393* (2013.01); *F25J 1/0035* (2013.01); *F25J 3/0209* (2013.01); *F25J 3/0247* (2013.01); *F25J 3/04381* (2013.01); *F25J 2200/02* (2013.01); *F25J 2200/90* (2013.01); *F25J 2200/94* (2013.01); *F25J 2220/68* (2013.01)

(58) Field of Classification Search
CPC ........ F25J 1/0035; F25J 3/0209; F25J 3/0247; F25J 3/04012; F25J 3/04048; F25J 3/04109; F25J 3/04381; F25J 3/04393; F25J 2200/02; F25J 2200/90; F25J 2200/94; F25J 2220/68
See application file for complete search history.

(56) References Cited

U.S. PATENT DOCUMENTS

| | | | | |
|---|---|---|---|---|
| 4,319,900 A | * | 3/1982 | Gram | B01D 53/0438 62/636 |
| 4,778,497 A | * | 10/1988 | Hanson | F25J 1/0007 62/613 |
| 5,205,134 A | * | 4/1993 | Gistau-Baguer | F25J 1/0007 62/335 |
| 5,964,985 A | * | 10/1999 | Wootten | B01D 53/24 201/14 |
| 2016/0047243 A1 | * | 2/2016 | Van De Loo | F01L 5/04 91/454 |
| 2016/0161179 A1 | * | 6/2016 | Alekseev | F25J 1/0251 62/615 |

* cited by examiner

*Primary Examiner* — Ryan A Reis

(57) ABSTRACT

An apparatus and process for the compression, expansion, evaporation, and liquefaction of gases or gaseous mixtures consisting of a gas liquefaction column comprising successive chambers made of balloons resembling those used in pneumatic suspensions, and double-piston bases in between the upper and lower end of each chamber. Some of the double-piston bases are fixed while others in between are mobile. The group of mobile double-piston bases is activated in a linear to-and-fro vertical stroke while the other group of double-piston bases remains stationary. This results in consecutive suction and compression of the chambers, creating a Joule-Thomson effect at each of them. This results in the cooling and liquefaction of the gas or gaseous mixture. The apparatus also comprises humidity extractors, and different types of valves and piping.

6 Claims, 9 Drawing Sheets

GAS LIQUEFACTION COLUMN

CROSS-REFERENCE TO RELATED APPLICATIONS

A petition for the grant of a patent on the same invention was filed with the Canadian Intellectual Property Office and a filing certificate has been issued with the application number 2,971,895 and a filing date of 2017 Jun. 27.

The applicant is claiming the benefit of this prior-filed pending application.

The present application relates to previous inventions: a Canadian patent for a Floating methanization system, patent number 2,875,345; a U.S. application under Ser. No. 14/967,277 entitled Floating methanation system; and another invention entitled Apparatuses for the functioning of a floating methanization system filed in Canada under application number 2,970,368.

BACKGROUND OF THE INVENTION

The invention is in the field of Liquefaction, solidification or separation of gases or gaseous mixtures by pressure and cold treatment, more specifically in the field of processes and apparatus for liquefying or solidifying gases or gaseous mixtures.

Gases, such as schist gas or biogas retrieved from landfill sites or methanation processes, must be purified by eliminating water vapour and separating the different components such as methane, propane, ethylene, and nitrogen in order to use these gases in their liquid form, which is more compact and versatile. Liquefaction is obtained by cold treatment.

The existing methods generally use compressors and refrigeration systems with different cryogenic processes used to cool and liquefy the gases.

The installations are often very expensive, requiring much space and time for construction. These facilities are often far away from the sources of gas supply.

The production sites of natural gas from municipal wastewater sludge, from schist sources, and particularly from manure, are partial, disparate, and far away from each other. A simple and functional liquefaction micro mechanism is thus essential in the above mentioned situations.

SUMMARY OF THE INVENTION

The invention described and claimed in the present specification is an apparatus and process for the compression, expansion, evaporation, and liquefaction of gases or gaseous mixtures by the action of multiple and consecutive compression and release of groups of double-piston bases meeting each other at the end of each linear course of a to-an-fro movement compressing and stretching balloons maintained in radial expansion by the interior vacuum of a tower that envelops them.

The proposed technology aims to solve problems of space and construction costs of the current technology, and provide small installations that can be installed on a methanation site.

DESCRIPTION OF THE INVENTION

Figure 1:
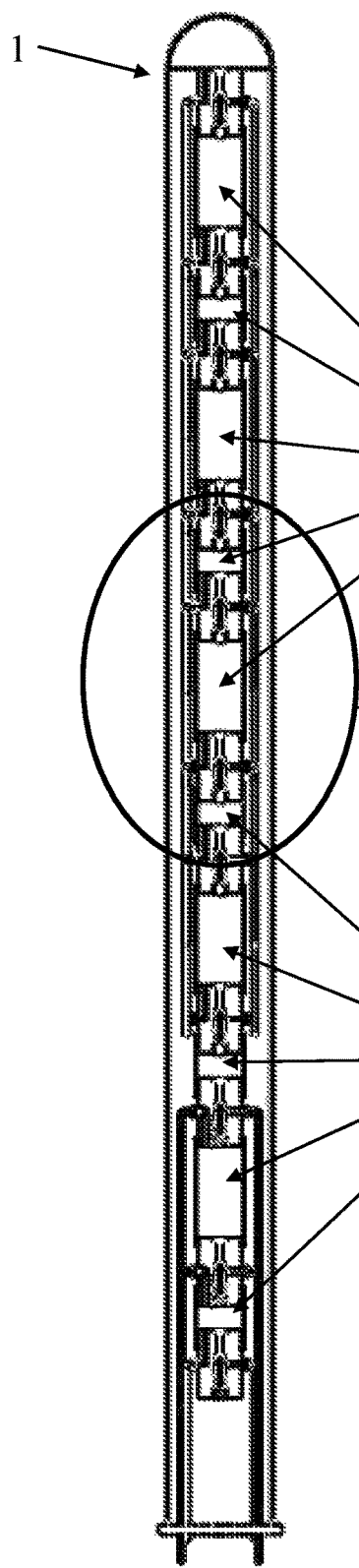
FIG. 1 represents a cut elevation view of a gas liquefaction column with its chambers 2 which is the space inside of balloons 2a, said chambers 2 capped at their top and bottom by double-piston bases 3 in a course position.
Figure 2:
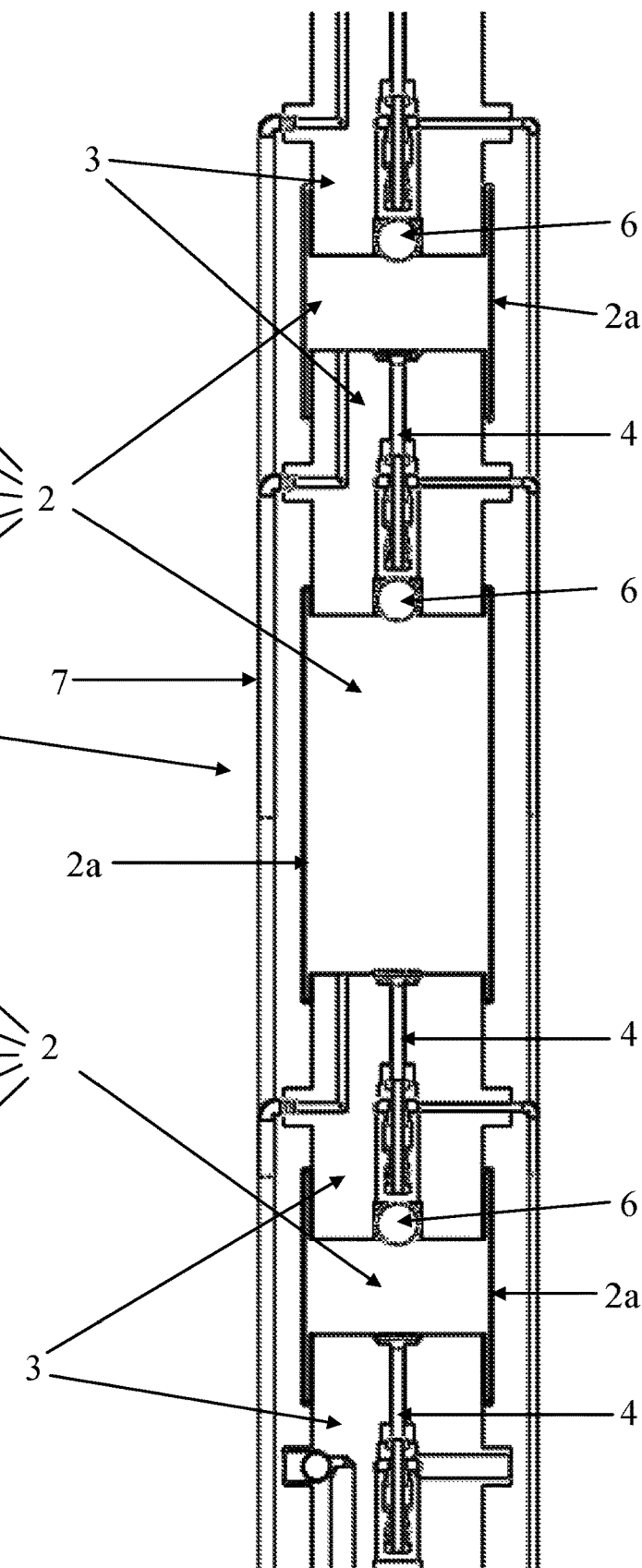
FIG. 2 is a close-up partial view of FIG. 1 showing the vertical alignment of the double-piston bases 3 and balloons 2a in the same course position as in FIG. 1, and also showing the adjustable decompression valves 4 at the top of the double-piston bases 3, and the floating valves 6 at the bottom of said double-piston bases 3.

Referring to the drawings in greater detail and by reference characters thereto, there is illustrated an apparatus and process to liquefy gases produced by methanation of putrescible matter or by other means.

The invention is an apparatus and process for the compression, expansion, evaporation, and liquefaction of gases or gaseous mixtures consisting of a gas liquefaction column 1 comprising successive chambers 2 made of balloons 2a resembling those used in pneumatic suspensions, and double-piston bases 3 in between the upper and lower end of each chamber 2, some of said double-piston bases 3 being fixed while others in between are mobile. The group of mobile double-piston bases 3 is activated in a linear to-and-fro vertical stroke while the other group of double-piston bases 3 remains stationary. This results in consecutive suction and compression effects. The group of chambers 2 moves vertically in a cylinder under vacuum to force inflation of the balloons 2a. These elements are shown in FIGS. 1 to 5.

Figures 3, 4:
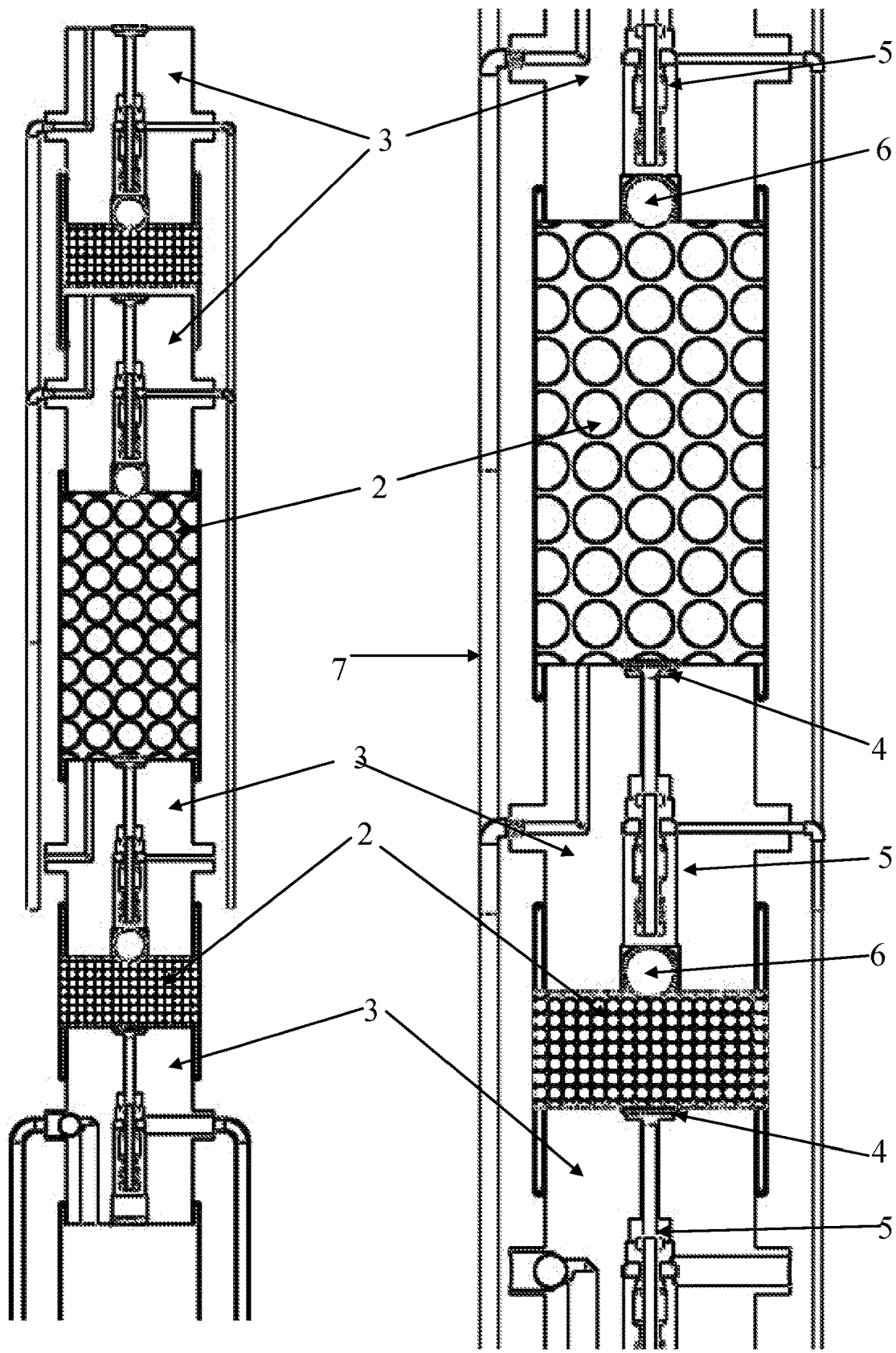
FIG. 3 represents the same elevation cut view as FIG. 2 with bubbles of different sizes representing the compression and expansion of the gases in the different chambers 2.
FIG. 4 is a close-up partial view of FIG. 3, also showing the adjustable decompression valves 4, the floating valves 6, the centered manifolds 5 of the double-piston bases 3, and part of the piping 7 which serves to transfer the liquefied gas.
Figure 5:
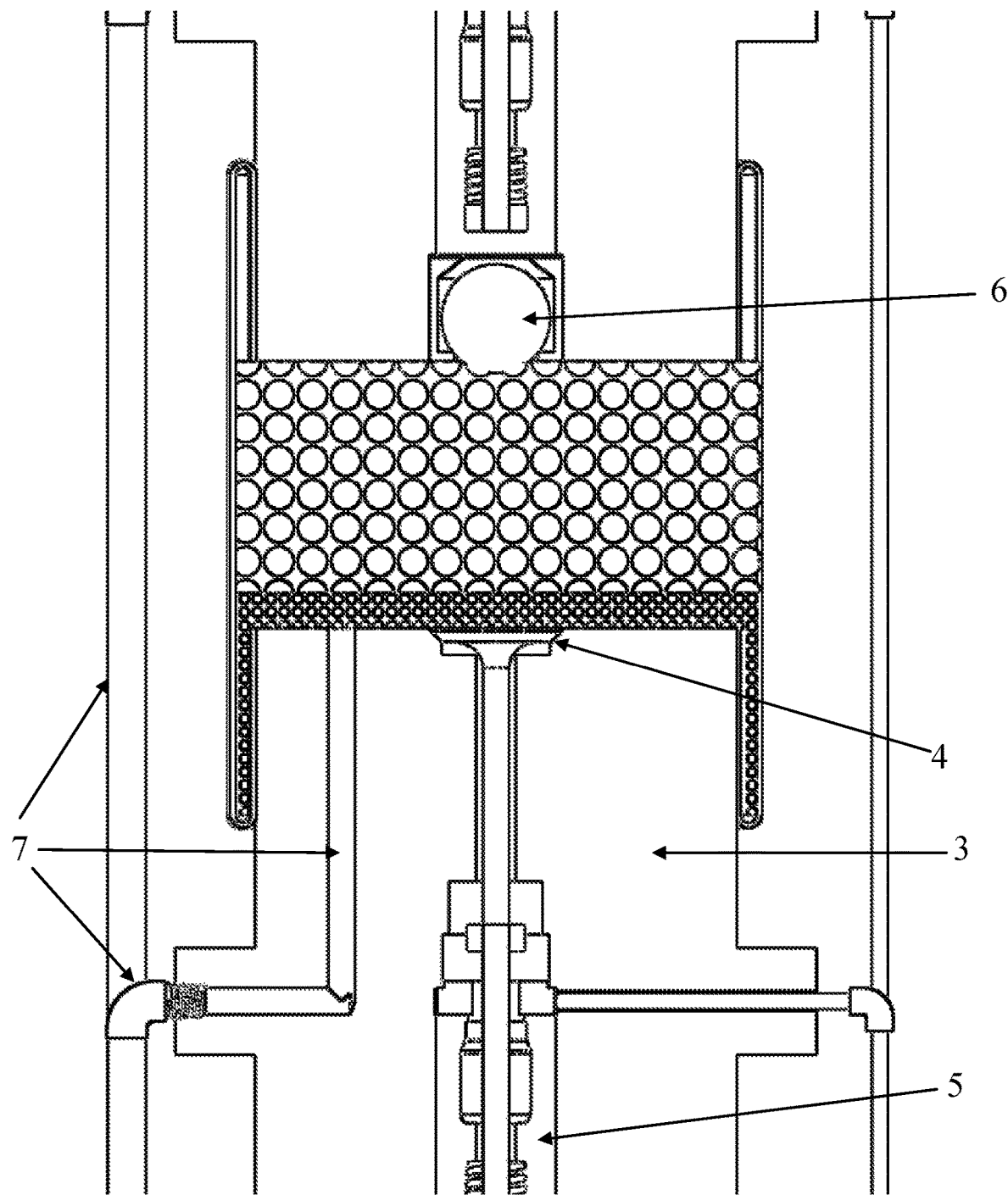
FIG. 5 is a close-up partial view of FIG. 4, demonstrating an accumulation of liquefied gas destined to block a floating valve 6 to escape through piping 7 ending with an extra pressure valve situated at the bottom end of said piping 7.

The double-piston bases 3 comprise a centered manifold 5 with an adjustable decompression valve 4 at the top and a floating ball 6 at the bottom. Cooling is a Joule-Thomson effect achieved when the gas crosses through the centered manifold 5 between the compression of one chamber 2 and the expansion of the next one, forcing the opening of the adjustable decompression valve 4 that caps the top of each double-piston base 3. These elements are best seen in FIGS. 4 and 5.

Cooling of the gas is obtained by the thrust of said gas through the adjustable decompression valves 4, by the compression of the chambers 2 that shrink in volume and the expansion of the following chambers 2 that expand. With each to-and-fro stroke of the mobile double-piston bases 3, a compression is exerted on the gas accumulated in the closing chambers 2 while a suction is simultaneously happening in the next expanding chambers 2 forcing said gas to cross the decompression valve 4, creating a Joule-Thomson effect proportional to the tension of said valve 4. The liquid created by the preceding cooling process blocks the floating ball 6 at the bottom of the double-piston bases 3, said liquid flowing out through a path connected to different conduits of a piping 7, forcing the opening of a pressure valve situated at the bottom end of said piping. Part of the piping 7 can be seen in FIGS. 4 and 5 and the entire set in FIGS. 8 and 9. In each step, when it crosses each ascending chamber 2, the gas becomes colder and colder by the Joule-Thomson effect from chamber 2 to chamber 2, gradually decanting its liquefied result.

Figure 6:
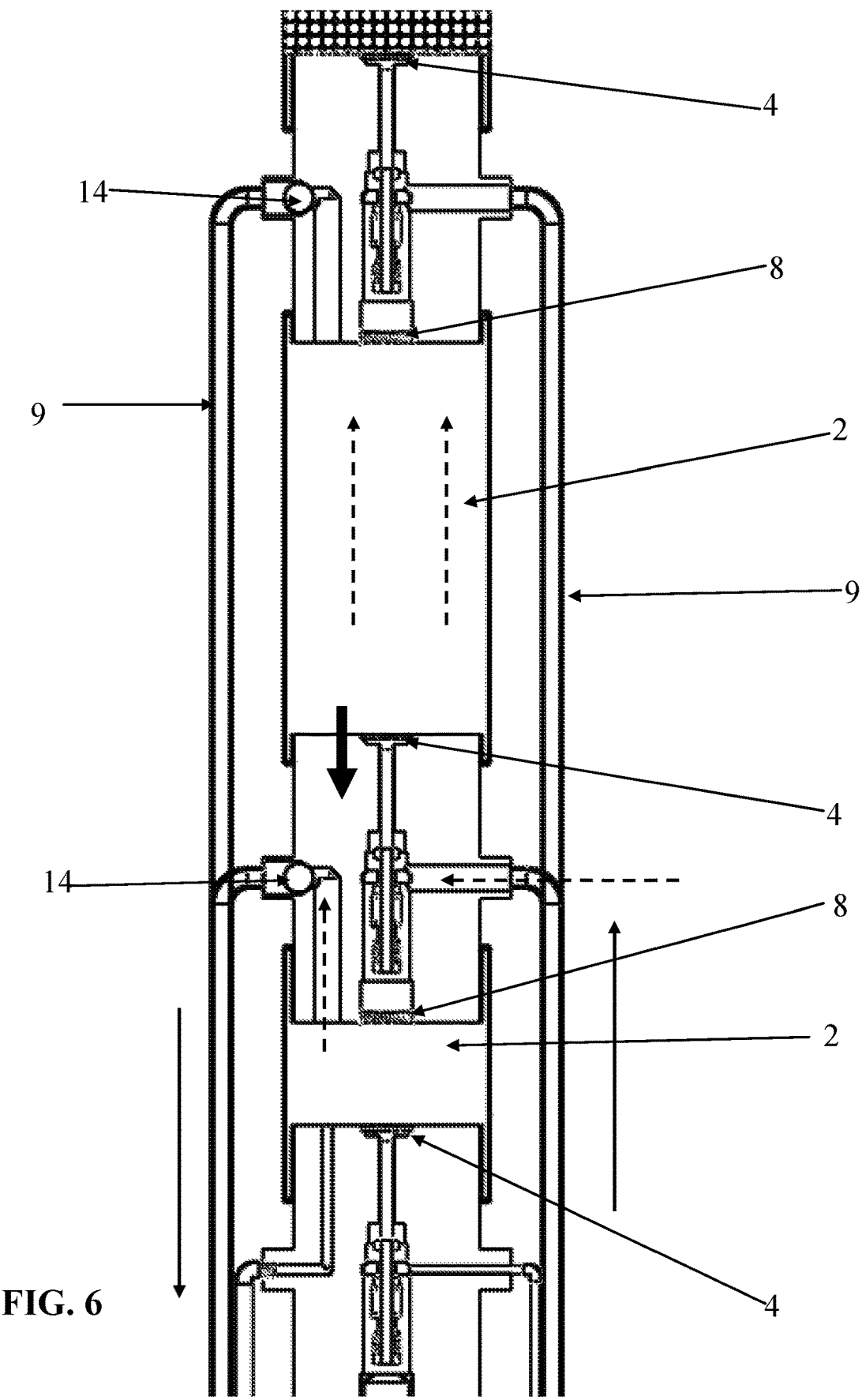
FIG. 6 shows a close-up elevation cut view of two double-piston bases 3 comprising a sealed plug 8, said bases further comprising a one-way valve 14 are typically shaped to transport the humidified gas to exterior humidity extractors through piping 9.
Figure 7:
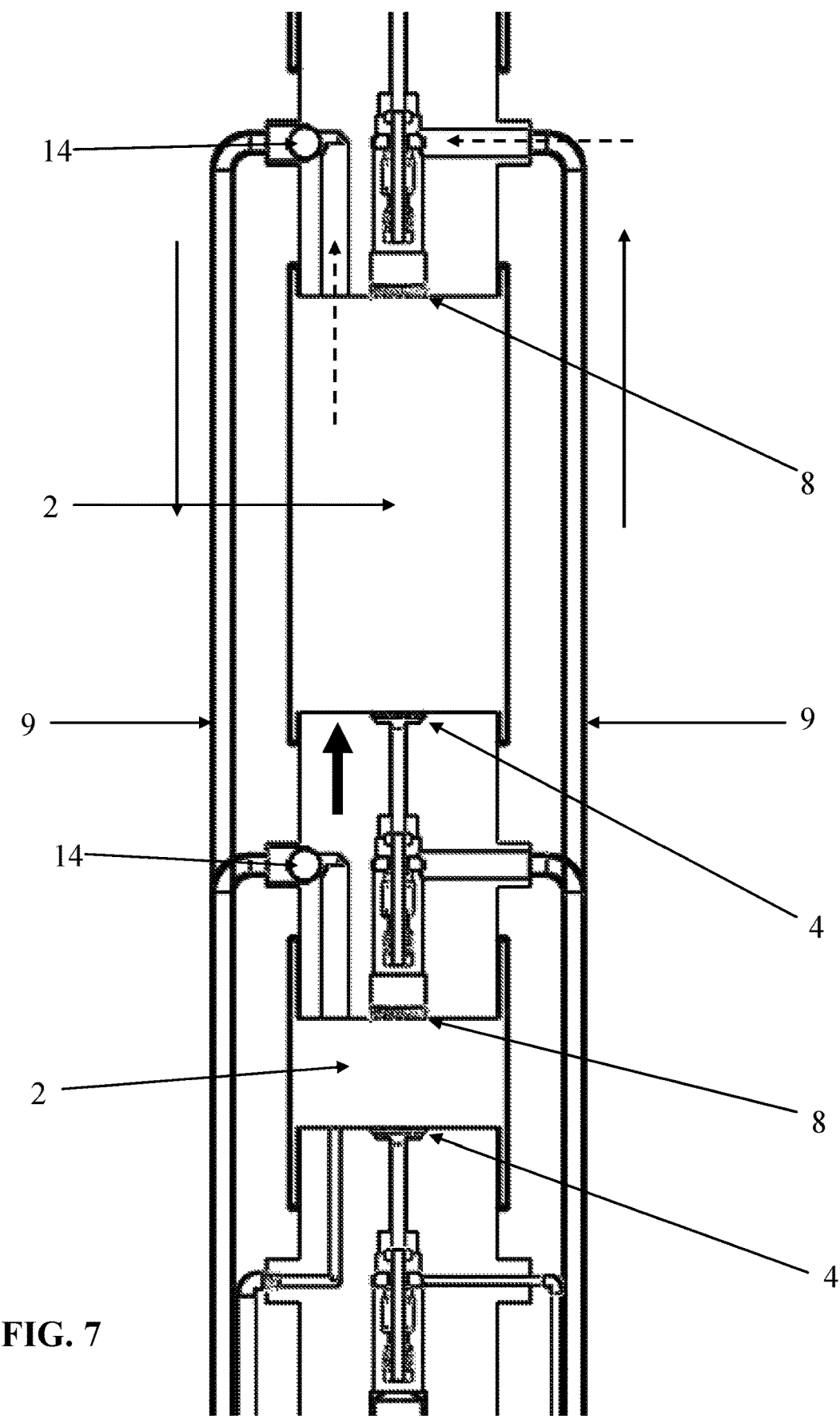
FIG. 7 shows the same elevation cut view as FIG. 6 representing the opposite action that compresses and sucks in the gases by another piping 9.

Two of the double-piston bases 3 comprise a sealed plug 8 at their bottom. These double-piston bases 3 further comprise a one-way valve 14 allowing the humid gas to be pumped through another piping 9 to reach a series of consecutive humidity extractors 10. The sealed plug 8, the piping 9, and the one-way valves 14 can be seen in FIGS. 6 and 7. In FIG. 6 is illustrated the descending action compressing the gas through the piping 9 while the expansion of the subsequent chamber sucks in the dehumidified gas. The humidity is extracted by freezing when projected in a spiral against the cooled walls of the extractors 10. The extractors 10, used intermittently, are recipients that also function by the forced infiltration (Joule-Thomson effect) of the gas through another type of adjustable decompression valve 11, which projects the cooled gas in a spiral vortex against the frozen circular wall of the humidity extractor 10, and freezes the condensed humidity turned into water drops. By consecutive intervals, a humidity extractor 10 will get rid of the accumulated ice by the arrival of hot water which will melt the ice becoming water that will flow out. The extractors 10 are illustrated in FIGS. 8, and 10A to 11B.

Figure 12:
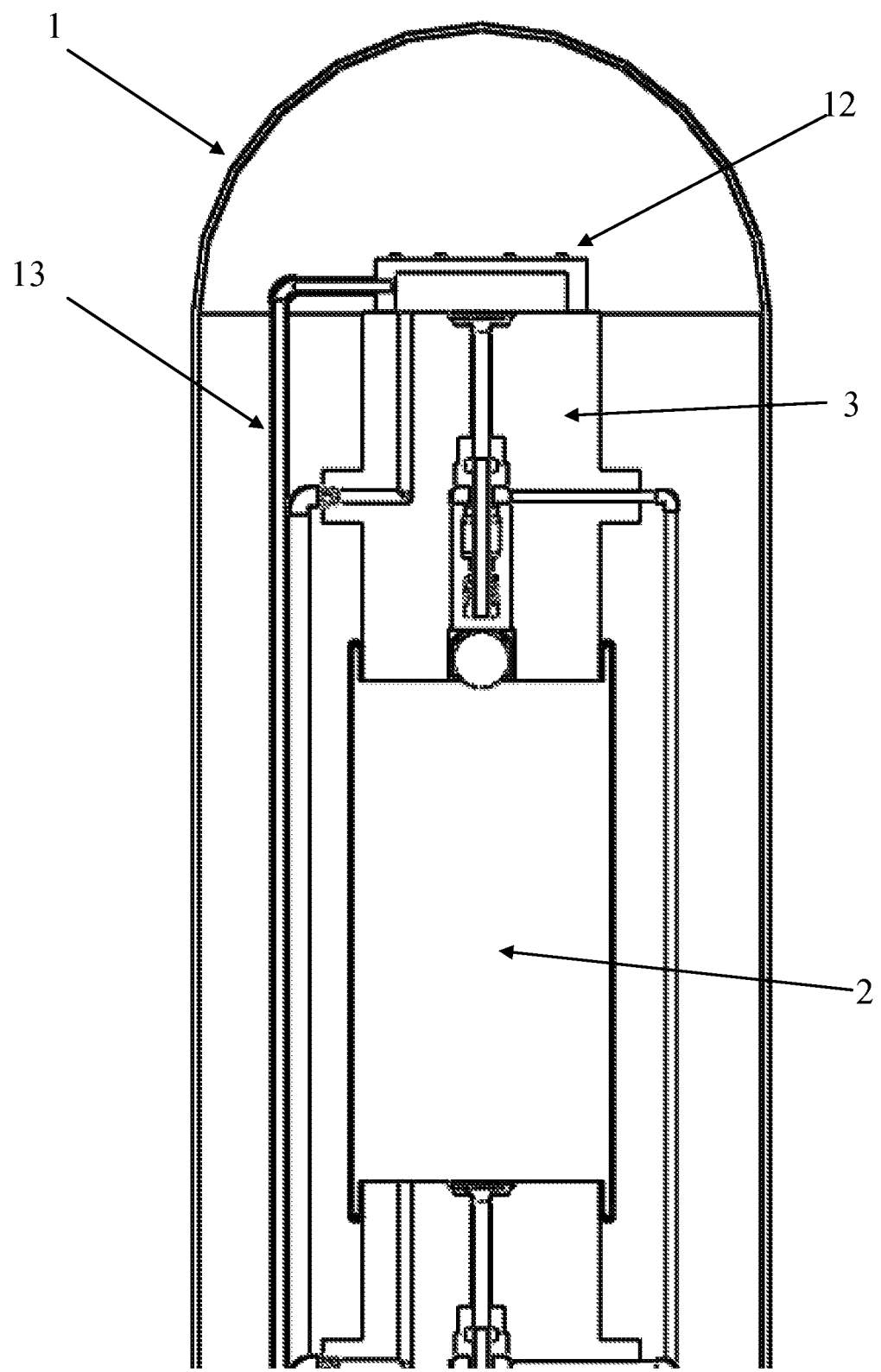
FIG. 12 represents a close-up detailed view of the upper part of a gas liquefaction column 1, showing a cover 12, and a conduit 13 for the transit to a next column.

The double-piston base situated at the top of the column further comprises a cover 12. In the event that, at the end of the course, the cycle of liquefaction of the gas is not completed, said gas is directed from the cover 12 to a conduit 13 to be directed to the entry of a new column (1) for a subsequent course. These elements are illustrated in FIG. 12.

The diametric volume of the system, the quantity of chambers 2, and the efficacy of the decompression valve 4 may be adjusted or changed in proportion to the necessary quantity of cooling steps.

Figures 8, 9:
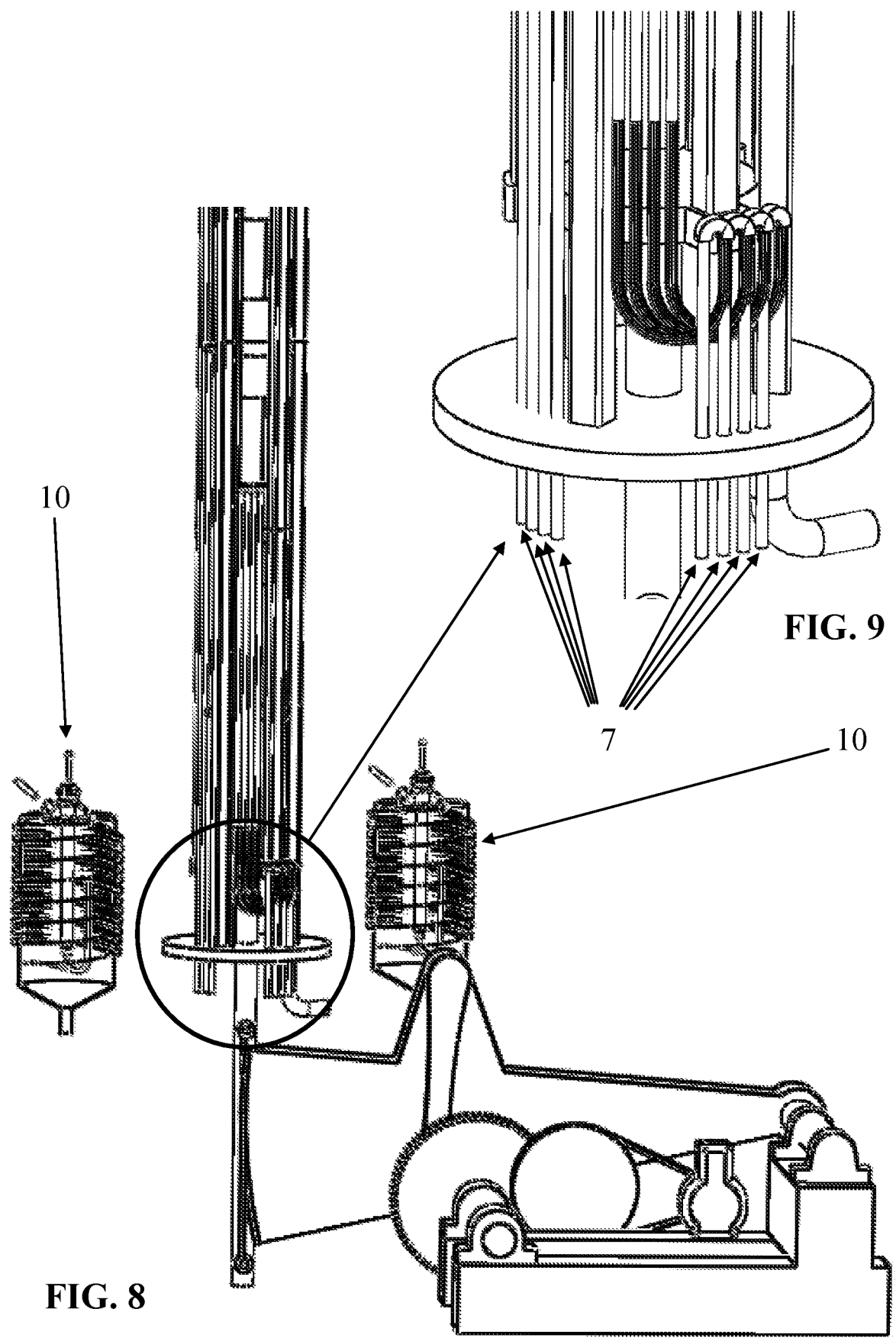
FIG. 8 is a cut elevation view illustrating a position for the humidity extractors 10, and the interior of a liquefaction column 1 moved by a crankshaft connected to a fly wheel.
FIG. 9 is a close-up detailed view of part of FIG. 8 showing piping 7, straight and telescopic or flexible.
Figure 10A:
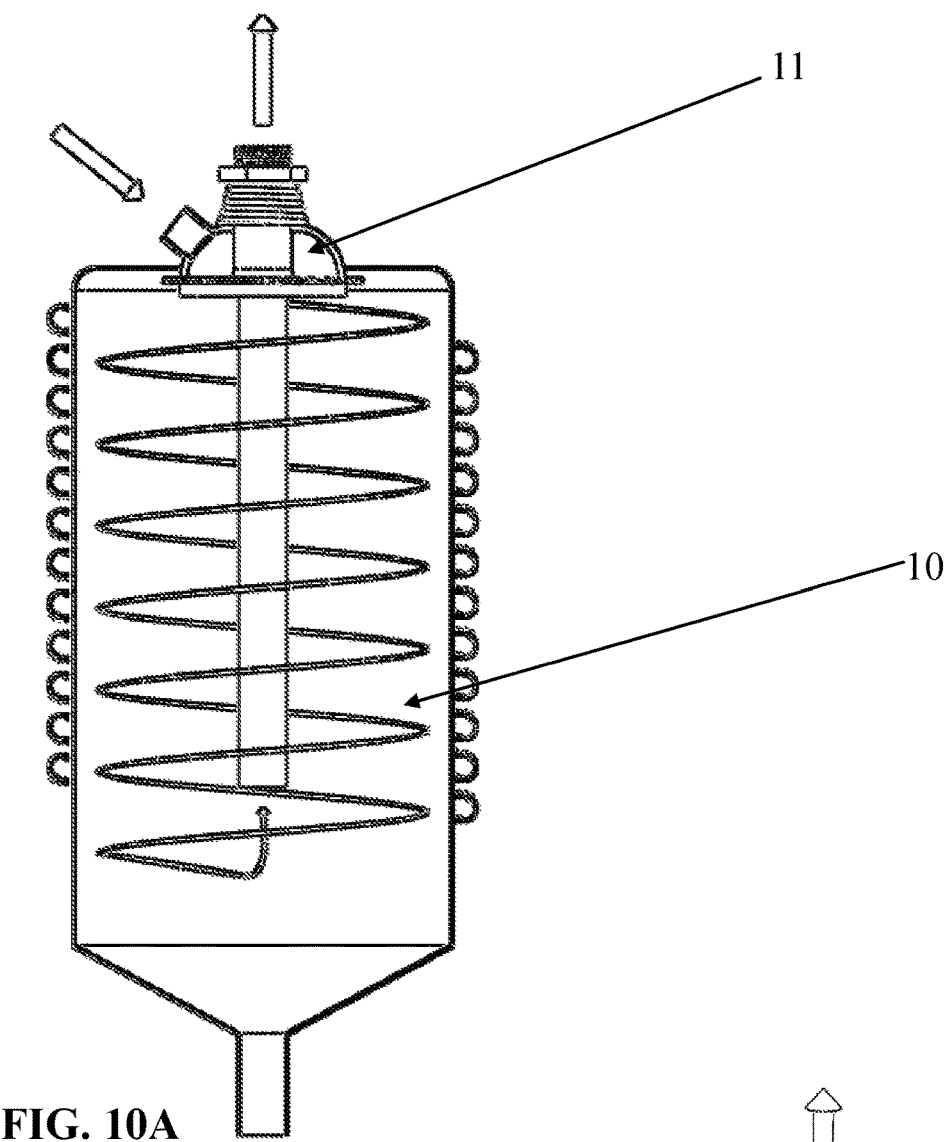
FIG. 10A is an elevation cut view of a humidity extractor where the entry of gas and the swirling of said gas crossing the adjustable expansion valve 11 are shown.
Figure 10B:
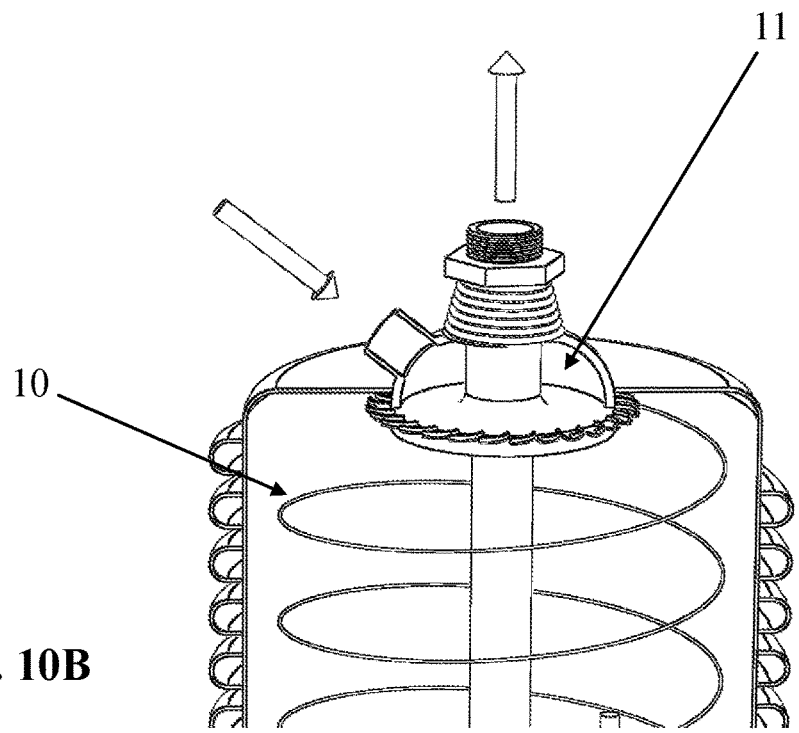
FIG. 10B is an elevation cut view of a humidity extractor 10 seen from another angle and illustrating the same principle as in FIG. 10A.
Figure 11:
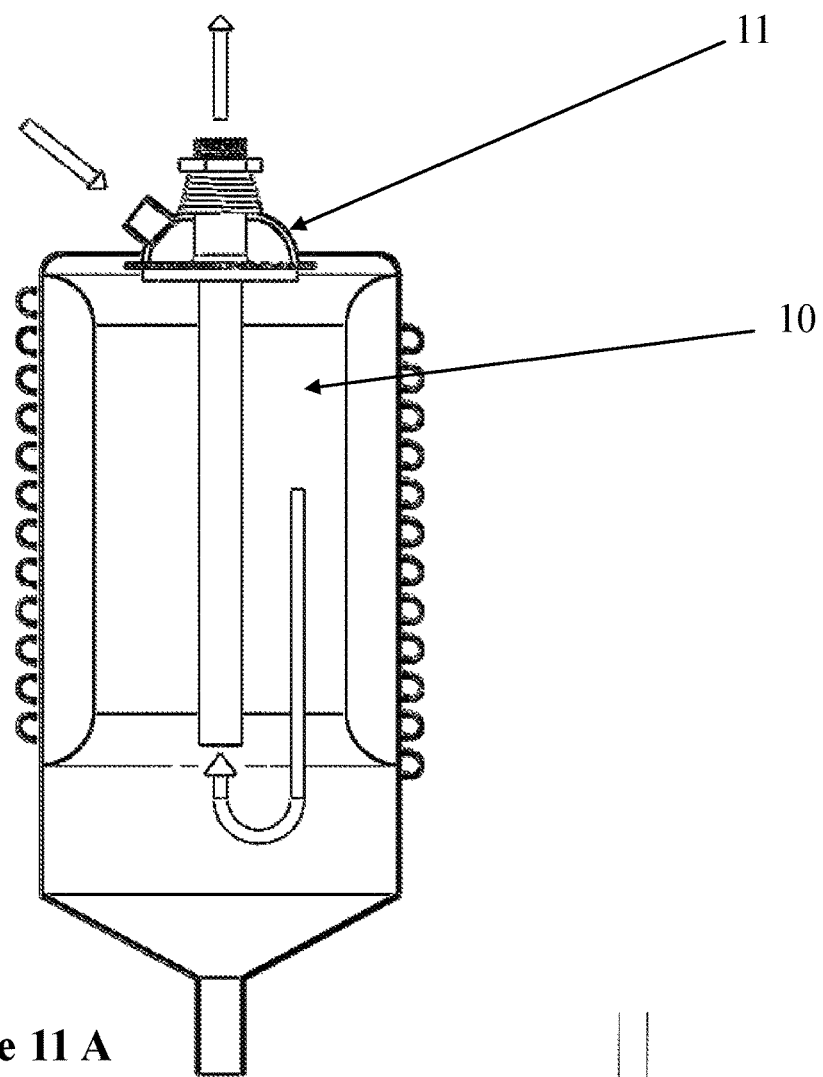
FIG. 11A is another elevation cut view of a humidity extractor 10 with a curved arrow showing the return of the gas after dehumidification.
FIG. 11B shows an elevation cut view of a humidity extractor 10 seen from the same angle as in FIG. 10B showing ice accumulated inside said extractor.
Figure 11:
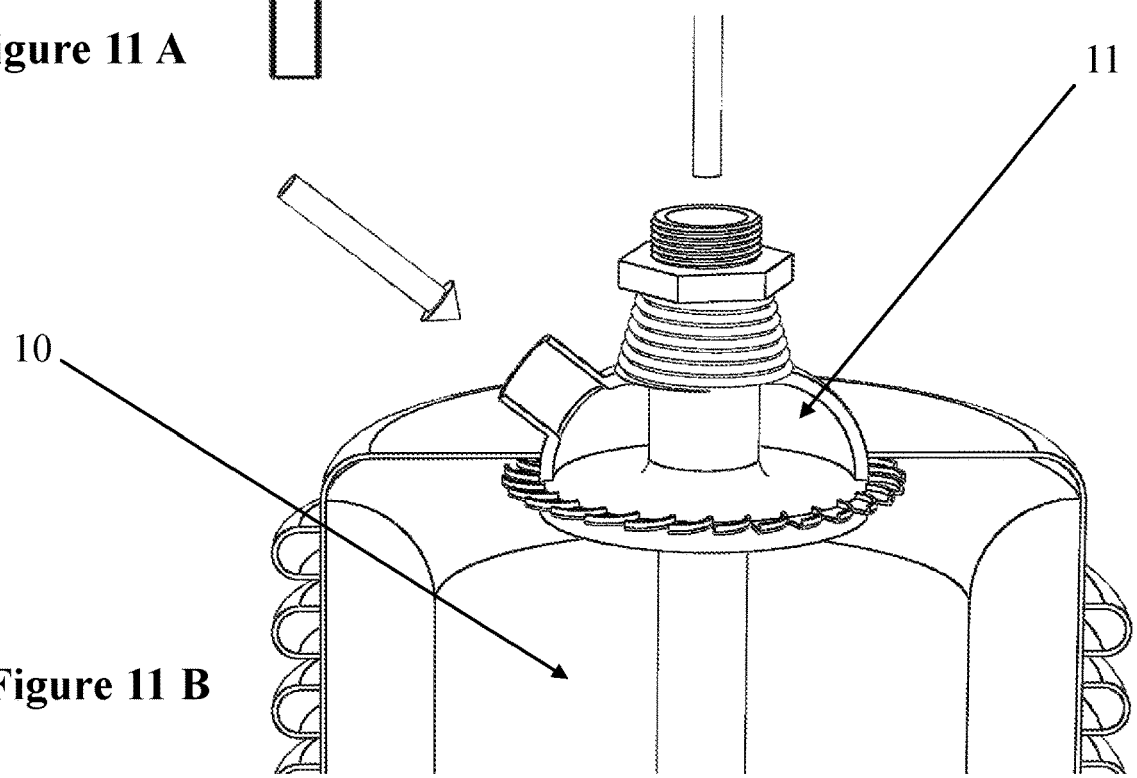

The to-and-fro movement of the mobile double-piston bases 3 in the liquefaction column 1 may be obtained by the combined action of a crankshaft to aid the use of a fly wheel, as well as the rhythm and force needed in proportion to the efforts of the end of the courses. This method is illustrated in FIG. 8.

It will be understood that the above described embodiments are for purposes of illustration only, and that changes or modifications may be made thereto without departing from the spirit and scope of the invention.

The invention claimed is:

1. An apparatus for the compression, expansion, evaporation, and liquefaction of gases or gaseous mixtures by cooling, consisting of a vertical gas liquefaction column (1) under vacuum, comprising successive chambers (2) made of balloons (2a), and groups of double-piston bases (3) in between the upper and lower end of each chamber (2), some of said double-piston bases (3) being fixed while others in between being mobile, the group of mobile double-piston bases (3) is activated in a linear to-and-fro vertical stroke compressing and expanding the balloons (2a) while the other group of double-piston bases (3) remains stationary, resulting in consecutive compression and suction of said chambers (2) to create the cooling effect, the double-piston bases (3) further comprising, at their bottom, a floating ball (6) that blocks the liquefied gases consecutively formed by the cooling process, and forces said liquefied gases to flow out through each individual conduit of a piping (7) to different tanks, forcing the opening of a pressure valve situated at the bottom end of said piping (7), said apparatus also comprising a series of humidity extractors (10) to extract the humidity of the entering gas, at the beginning of the process, by freezing, said humid gas transiting from another piping (9) to said extractors (10).

2. The apparatus of claim 1 wherein the double-piston bases (3) further comprise, at their top, an adjustable decompression valve (4) through which the gas forces its way when a group of chambers (2) are compressed and reduced in volume, said gas being sucked in by the simultaneous expansion of the other group of chambers (2), the expansion of the gas inside the expanded chambers creating the cooling effect.

3. The apparatus of claim 1 wherein the double-piston bases (3) further comprise a centered manifold (5) to allow the gas to transit through the double-piston base from the compressed chamber (2) to the expanded chamber (2).

4. The apparatus of claim 1 wherein two of the double-piston bases (3) further comprise a sealed plug (8) at their bottom and a one-way valve (14) allowing the humid gas to be pumped through the piping (9) to reach the extractors (10) where the humidity is extracted by being projected in spirals on the cooled walls of said extractors (10).

5. The apparatus of claim 1 wherein the humidity extractors (10) further comprise an adjustable decompression valve (11) that allows for the forced infiltration of the gas which is projected in a swirling motion against the cooled walls of said extractors (10), freezing the humidity condensed into water drops by the cooling effect, the accumulated ice being evacuated intermittently by the arrival of hot water that will melt it, the ice then becoming water that will flow out.

6. The apparatus of claim 1 wherein the double-piston base (3) situated at the top of the liquefaction column (1) further comprises a cover (12) connected to a conduit (13) through which gas that is not completely liquefied at the end of a course is directed from said cover (12) to said conduit (13) to be directed to the entry of a new column (1) for a subsequent course.

* * * * *